United States Patent [19]

Anders et al.

[11] Patent Number: 4,888,191

[45] Date of Patent: * Dec. 19, 1989

[54] **METHOD FOR DELAYING *CLOSTRIDIUM BOTULINUM GROWTH* IN FISH AND POULTRY**

[75] Inventors: Robert J. Anders, Middleton; John G. Cerveny; Andrew L. Milkowski, both of Madison, all of Wis.

[73] Assignee: Oscar Mayer Foods Corporation, Madison, Wis.

[ * ] Notice: The portion of the term of this patent subsequent to Jan. 17, 2006 has been disclaimed.

[21] Appl. No.: 287,252

[22] Filed: Dec. 20, 1988

Related U.S. Application Data

[63] Continuation of Ser. No. 120,769, Nov. 13, 1987, Pat. No. 4,798,729, which is a continuation of Ser. No. 808,319, Dec. 12, 1985, abandoned.

[51] Int. Cl.$^4$ ................................................ A23B 4/14
[52] U.S. Cl. .................................. 426/281; 426/325; 426/326; 426/332; 426/532
[58] Field of Search ............... 426/332, 264, 265, 268, 426/532, 325, 326, 412, 281

[56] References Cited

U.S. PATENT DOCUMENTS

| | | | |
|---|---|---|---|
| 3,658,551 | 4/1972 | Bundus et al. | 426/332 |
| 3,852,486 | 12/1974 | Walker et al. | 426/332 X |
| 3,934,044 | 1/1976 | Busch et al. | 426/332 X |
| 4,011,346 | 3/1977 | Ernst | 426/332 X |
| 4,075,357 | 2/1978 | Szezesniak et al. | 426/332 |
| 4,212,894 | 7/1980 | Franzen et al. | 426/332 |
| 4,262,027 | 4/1981 | Tonner et al. | 426/332 X |
| 4,798,729 | 1/1989 | Anders et al. | 426/326 |

OTHER PUBLICATIONS

Patent Abstracts of Japan, vol. 9, No. 32 (C-265) [1755], 9th Feb. 1985; and JP-A-59 175 870 (Shiyouwa Sangyo K.K.) 04-10-1984.

Purac Inc., "Lactic Acid and Lactates", pp. 10 & 11.

C. V. Chemie Combinatie Amsterdam C.C.A., 2 pages.

Krol, "Meat Products", Voedingsmiddelen Technologie, 1972, pp. 157–158.

*Primary Examiner*—Arthur L. Corbin
*Attorney, Agent, or Firm*—Joseph T. Harcarik

[57] ABSTRACT

This invention pertains to poultry or fish foodstuffs wherein lactate salt is added in an amount effective to delay *Clostridium botulinum* growth.

11 Claims, No Drawings

METHOD FOR DELAYING *CLOSTRIDIUM BOTULINUM* GROWTH IN FISH AND POULTRY

This is a continuation of application Ser. No. 120,769, filed 11/13/87, now U.S. Pat. No. 4,798,729, which is a continuation of Ser. No. 808,319, filed 12/12/85 now abandoned.

BACKGROUND OF THE INVENTION

1. Field of the Invention

This invention relates to poultry and fish foodstuff containing lactate salt in amounts effective to delay Clostridium botulinum growth.

2. Description of the Prior Art

The preservation of foodstuff has many aspects. For example, it has been suggested to add sodium lactate to meat products, such as ham and sausage at levels of approximately 1 to 3%. It is suggested that the sodium lactate lowers the $a_w$ of the foodstuff and has a bacteriostatic effect which results in a better shelf life during refrigeration, a possibility of storage without refrigeration and a possibility of lowering the sodium chloride content of the foodstuff resulting in a better taste without the decreased shelf life. Sodium lactate, however, has not been suggested as an agent for controlling or delaying *Clostridium botulinum* growth.

The need to control *Clostridium botulinum* occurs in foodstuffs such as meats and poultry which are packaged and cooked, but not sterilized, in anaerobic plastic barrier packages. Under temperature abuse, *Clostridium botulinum* may grow and produce toxin. Injury to humans resulting from this bacteria has been relatively rare since there are various means for preventing its growth. For example, high temperature processing of foodstuffs prior to packaging or after packaging will destroy the *Clostridium botulinum*. Other means for controlling the *Clostridium botulinum* have been to refrigerate the foodstuff and to add agents such as sodium nitrite to foodstuff such as bacon. The sodium nitrite while delaying the growth of *Clostridium botulinum* also forms a durable red pigment in the meat. This red coloring is desirable in many foodstuffs such as pork and beef products but is undesirable in other products such as poultry and fish.

While the control of food *Clostridium botulinum* has been successful, it is desired to find additional method of controlling *Clostridium botulinum* without occuring side effects such as red coloring described above.

SUMMARY OF THE INVENTION

This invention pertains to foodstuff selected from the group consisting of fish and poultry which contains a lactate salt in amounts effective to delay *Clostridium botulinum* growth.

It has been found that when sodium lactate is added to poultry or fish foodstuffs, growth of *Clostridium botulinum* in the foodstuff is delayed but the foodstuff is not colored red by the sodium lactate salt.

DETAILED DESCRIPTION OF THE INVENTION

The foodstuffs included in this invention are non-red meat foodstuff such as fish and poultry wherein the poultry includes meats such as turkey and chicken. This invention is particularly useful when the fish or poultry is packaged in anaerobic conditions such as packaged whole meat or when the fish and poultry is packaged with other foodstuffs such as refrigerated meals and soups.

The lactate salt employed in this invention includes salts such as sodium lactate, calcium lactate, potassium lactate and ammonium lactate. Preferably the lactate salt is sodium lactate. The lactate salts are employed in amounts effective to delay *Clostridium botulinum* growth. The amount of a lactate salt effective to delay botulinum growth can be determined by a simple abusive temperature test procedure.

Foodstuffs that are to be protected by the lactate salt are stored at 80° F. A control is utilized wherein no lactate salt or other *Clostridium botulinum* delay agent is used. The product is then treated with levels of lactate salt. The products are analyzed at various time periods. The levels of the lactate salt which delay the toxin formation compared to the control are amounts which are effective for delaying the *Clostridium botulinum* growth.

In general these amounts range from about 1 to about 7% lactate salt and preferably are in the range from about 1.5 to 3.5 lactate salt.

The lactate salt may be incorporated into the foodstuff by a wide variety of procedures. For example, the lactate salts may be added into the foodstuff either in a concentrated form or as a solution such as an aqueous solution. The lactate salts may be mixed directly into the foodstuff or may be injected into the foodstuff utilizing injection needles.

After the lactate salts are added to the foodstuff the foodstuff may be packaged in anaerobic plastic barrier packages and then heated to temperatures sufficient to cook the foodstuff but not sufficient to sterilize the foodstuff. Cooking the foodstuff below sterilization temperatures is desirable for the quality of the cooked foodstuff but *Clostridium botulinum* may later grow if temperatures abused. The added lactate salts will, however, delay *Clostridium botulinum* growth. Other processing means may also be used such as cooking the foodstuff with the lactate salt added and then packaging. In this process the concerns for *Clostridium botulinum* growth are lessened but the added lactate salt is effective for delaying *Clostridium botulinum* growth.

It has also been found that while the lactate salts delays the growth of *Clostridium botulinum*, they do not add any coloring to the meat such as a red coloring.

While the lactate salts may be added as sole agent for delaying *Clostridium botulinum*, the lactate salts may be added in combination with other agents which delay *Clostridium botulinum* growth such as sodium chloride or sodium nitrite. In such cases the amount of lactate salts added will be reduced and the effective amount of lactate salt will be the amounts which delay *Clostridium botulinum* in combination with the other growth delaying agents.

The following examples are further presented to describe the invention, but it is to be understood that the invention is not to be limited to the details described therein.

EXAMPLE I

In these examples, a turkey batter was prepared by grinding turkey breasts and mixing salt at 1.4 wt % and phosphate at 0.49 wt %. *Clostridium botulinum* spores were added to the turkey batter. The batter was divided into aliquots. Some of the aliquots were designated controls, and no sodium lactate was added. To the other aliquots were added sodium lactate in varying amounts as indicated in Table I below. The inoculated aliquots were vacuum packaged, and water cooked to an internal temperature of 160° F. The cooked turkey products were then cooled to 80° F. and incubated at that temperature. Periodically, the product was removed and tested for toxin. The results of the test are shown in Table I.

TABLE I

Effect of Sodium Lactate on *C. botulinum* in Temperature Abused Cook-In Turkey

| Percent Lactate | Days at 80° F. | | | | | | |
|---|---|---|---|---|---|---|---|
| | 2 | 4 | 5 | 7 | 8 | 9 | 10 |
| 0 (Control) | 0/5[a] | 5/5 | | | | | |
| 2.0 | 0/5 | 2/5 | 5/5 | | | | |
| 2.5 | 0/5 | 0/5 | 0/5 | 5/5 | | | |
| 3.0 | 0/5 | 0/5 | 0/5 | 4/5 | 5/5 | | |
| 3.5 | 0/5 | 0/5 | 0/5 | 0/5 | 0/5 | 2/5 | 5/5 |

[a] number of toxic samples/number of samples examined.

From these results it is clear that sodium lactate added at the amounts indicated delays the growth of *Clostridium botulinum*.

EXAMPLE II

According to this example 1,000 lbs. of fresh trim turkey breasts are injected with sodium lactate at a weight percent of 2.5% sodium lactate. The turkey breasts range from about 2.5 to about 3.75 lbs. The turkey breasts are injected with a brine solution comprising the following: 69.50% water; 22.49% sodium lactate syrup (60% sodium lactate; 40% water); 6.16% salt and 1.85% sodium phosphate. For each pound of turkey breasts there is injected 0.2274 lbs. of brine using a Townsend Model 1400 type injector.

The turkey breasts are placed on a rack in a oven and cooked at high humidity at 160° F. dry bulb, for 2 hours and then at 170° F. dry bulb, until the internal temperature of the turkey breasts is 155° F. (approximately 15 minutes). The oven is turned off, but not opened and a solution of 2 lbs. of a commercial caramel powder and 13 lbs. of water is introduced to the oven through atomizing nozzles along with air over a period of 45 minutes.

The turkey breasts are then removed from the oven, chilled and packaged.

We claim:

1. A method for delaying *Clostridium botulinum* growth in a foodstuff selected from the group consisting of fish and poultry, the method consisting essentially of:
   (a) adding a lactate salt to a fresh foodstuff selected from the group consisting of fish and poultry, said lactate salt being added in an amount of about 1% to 7%;
   (b) packaging the fresh foodstuff in a plastic barrier package; and
   (c) cooking the foodstuff in said plastic barrier package to a temperature sufficient to cook the foodstuff but not sufficient to sterilize the foodstuff.

2. A method according to claim 1, wherein the foodstuff comprises poultry.

3. A method according to claim 2, wherein the foodstuff comprises turkey.

4. A method according to claim 1, wherein the lactate salt is added in an amount from about 1.5% to about 3.5%.

5. A method according to claim 1, wherein the lactate salt is selected from the group consisting of sodium lactate, calcium lactate, potassium lactate and ammonium lactate.

6. A method according to claim 5, wherein the lactate salt comprises sodium lactate.

7. A method according to claim 5, wherein the lactate salt comprises calcium lactate.

8. A method according to claim 5, wherein the lactate salt comprises potassium lactate.

9. A method according to claim 5, wherein the lactate salt comprises ammonium lactate.

10. A method according to claim 1, wherein adding said lactate salt is effected by injecting the lactate salt into said foodstuff.

11. A method according to claim 1, wherein the foodstuff is cooked to an internal temperature of about 160° F.

* * * * *